(12) United States Patent
Bauer

(10) Patent No.: US 7,906,025 B2
(45) Date of Patent: Mar. 15, 2011

(54) SYSTEMS AND METHODS FOR TREATMENT OF LIQUID SOLUTIONS FOR USE WITH LIVESTOCK OPERATIONS

(75) Inventor: Walter J. Bauer, Baden (CA)

(73) Assignee: EBED Holdings Inc., Baden, Ontario (CA)

( * ) Notice: Subject to any disclaimer, the term of this patent is extended or adjusted under 35 U.S.C. 154(b) by 1091 days.

(21) Appl. No.: 11/350,164

(22) Filed: Feb. 7, 2006

(65) Prior Publication Data

US 2006/0175254 A1 Aug. 10, 2006

Related U.S. Application Data

(60) Provisional application No. 60/651,041, filed on Feb. 7, 2005.

(51) Int. Cl.
*B01D 61/00* (2006.01)
*A01K 1/10* (2006.01)
*B01D 63/00* (2006.01)

(52) U.S. Cl. .................. 210/652; 210/650; 210/500.29; 210/195.1; 210/257.2; 119/51.01; 119/51.5; 119/174

(58) Field of Classification Search .................. 210/652, 210/660, 663, 257.2, 222, 195.2, 195, 767; 204/660, 665
See application file for complete search history.

(56) References Cited

U.S. PATENT DOCUMENTS

| 3,933,606 A | 1/1976 | Harms |
| 4,342,730 A | 8/1982 | Perotta |
| 4,387,026 A | 6/1983 | Woolacott |
| 4,772,369 A | 9/1988 | Mercier et al. |
| 4,808,287 A | 2/1989 | Hark |
| 5,246,586 A | 9/1993 | Ban et al. |
| 5,591,317 A | 1/1997 | Pitts, Jr. |
| 5,620,597 A * | 4/1997 | Andelman .................. 210/198.2 |
| 5,695,644 A | 12/1997 | Buchanan et al. |
| 5,817,224 A | 10/1998 | Pitts, Jr. |
| 5,906,800 A | 5/1999 | Napierkowski et al. |
| 5,951,856 A | 9/1999 | Cho |

(Continued)

FOREIGN PATENT DOCUMENTS

| AU | 580474 | 10/1987 |
| DE | 41 00 799 A1 | 7/1992 |
| GB | 1 288 552 | 9/1972 |
| WO | 95/15922 A1 | 6/1995 |
| WO | 98/46533 A1 | 10/1998 |

OTHER PUBLICATIONS

Atkins, Physical Chemistry 6th Ed., 1999, W.H. Freeman and Co., pp. 253-266 and 937.

(Continued)

*Primary Examiner* — Ana M Fortuna
(74) *Attorney, Agent, or Firm* — Ann W. Speckman; Janet Sleath; Speckman Law Group PLLC

(57) ABSTRACT

Methods and systems for enhancing of quality of liquid by treating a source liquid to enhance the concentration of low zeta potential crystals and produce a treated liquid having a higher concentration of low zeta potential crystals that that of the source liquid. The inventive system comprises an aqueous liquid source having a threshold concentration of selected minerals and a low zeta potential crystal generator for treating the aqueous source liquid to produce treated liquid having an enhanced concentration of low zeta potential crystals, and at least one filtration device for substantially removing bacteria, viruses, cysts, and the like from the treated source liquid.

11 Claims, 7 Drawing Sheets

U.S. PATENT DOCUMENTS

| | | | |
|---|---|---|---|
| 5,997,812 A * | 12/1999 | Burnham et al. | 422/24 |
| 6,368,849 B1 * | 4/2002 | Norddahl | 435/262 |
| 6,416,668 B1 | 7/2002 | Al-Samadi | |
| 6,679,988 B2 | 1/2004 | Gsell | |
| 6,689,270 B1 | 2/2004 | Evert | |
| 6,849,178 B2 * | 2/2005 | Hecking | 210/205 |
| 2001/0035342 A1 | 11/2001 | Morse et al. | |
| 2002/0162801 A1 | 11/2002 | Sawada | |
| 2003/0234219 A1 | 12/2003 | Verma | |

OTHER PUBLICATIONS

Turbu-Flow Corporation, "Turbu-Flow Corporate Literature," Oct. 16, 2003 (accessed via www.archive.org, searched for www.turbu-flow.com.au; full address of reference: http://web.archive.org/web/20031218203111/ww.turbu-flow.com.au/products/tufpool.htm).

Zeta Rod, "Zeta Rod Corporate Literature," Sep. 28, 2002 (accessed via www.archive.org, searched for www.zetarod.com; full address of reference: http://web.archive.org/web/20021202090451/www.zetarod.com/hvacrtop.shtml).

* cited by examiner

Calcium carbonate crystals from untreated water

Calcium carbonate crystals from the treated water

SYSTEMS AND METHODS FOR TREATMENT OF LIQUID SOLUTIONS FOR USE WITH LIVESTOCK OPERATIONS

CROSS REFERENCE TO RELATED APPLICATION

This application claims priority under 35 U.S.C. §119(e) to U.S. Provisional Application No. 60/651,041, filed Feb. 7, 2005.

FIELD OF THE INVENTION

The present invention generally relates to systems and methods for improving quality of liquid solutions, for example, by generating low zeta potential crystals to enhance the quality of liquid solutions for use with livestock operations.

BACKGROUND OF THE INVENTION

A common hazard of liquid feed used for livestock operations, especially water, is contamination by harmful microorganisms such as bacteria, viruses, cysts, and the like. The microorganisms present in liquid systems can come from a variety of sources. The safety and potability of certain water supplies, using source liquid from wells, springs, water pumps, reservoirs, water treatment devices, water lines, and the like, rests in the hands of the owner.

Bacteria and microorganisms present in water unfortunately cannot be seen or easily detected, and many health-related symptoms among livestock are caused by bacteria and microorganisms that are not immediately visible. Water contamination is generally identified by one or a panel of laboratory tests. However, testing a water supply for a specific disease-causing organism can be quite expensive. Also, handling and intentionally culturing disease producing organisms requires special training and equipment.

Boiling of water is known to be an extremely effective means to eliminate bacterial populations and ensure that the water is safe. Water that has been boiled continuously for at least 15 minutes will be substantially free from nearly all bacteria. However, this method of eliminating bacteria and microorganisms in water is not always practical and almost impossible for treatment of large volumes of water.

Many water treatment systems designed to supply livestock are known in the art. Most of these water treatment systems filter source water at the point of entry and generally provide barrier to bacteria, parasites, and viruses. However, prolonged use of these water treatment systems can result in clogging of the water filters. Thus, the filter cartridges need to be replaced frequently and the cost of replacement filters can be expensive.

U.S. Pat. No. 5,591,317 discloses an electrostatic-field generator for use in water treatment that consists of a vitrified ceramic tube of unibody construction having a single open end adapted to receive a high-voltage power cable through an insulated cap. The interior surface of the ceramic tube is lined with a layer of conductive material electrically connected to the power cable, thereby providing a relatively-large conductive surface in intimate contact with the dielectric surface of the ceramic tube. In operation, the device is immersed in a body of water connected to ground and the power cable is energized with a high DC voltage, thereby creating an electrostatic field across the dielectric of the tube's ceramic and across the body of water. Because of the difference in the dielectric coefficients of the materials, the majority of the applied potential is measured across the water, thus providing the desired electrostatic effect on its particulate components.

U.S. Pat. No. 5,817,224 discloses a method for enhancing the efficiency of a solid-liquid separation process by using an electrostatic-field generator that utilizes a vitrified ceramic tube of unibody construction having a single open end adapted to receive a high-voltage power cable through an insulated cap. The interior surface of the ceramic tube is lined with a layer of conductive material electrically connected to the power cable, thereby providing a relatively-large conductive surface in intimate contact with the dielectric surface of the ceramic tube. The device is used in connection with conventional chemical additives for separating suspended solids from water to reduce chemical consumption and improve operating efficiency. The device is immersed in the water carrying suspended particles upstream of the treatment with chemical agents and is energized with a high DC voltage, thereby creating an electrostatic field across the dielectric of the tube's ceramic and across the body of water. The charge on the surface of particles to be separated by physical aggregation is altered by the electrostatic field so generated and is manipulated so as to produce enhanced performance by the chemicals used in the conventional process downstream.

U.S. Pat. No. 4,772,369 discloses a process and an apparatus for treating water which comprises decomposing the minerals dissolved in the water into cations comprising ferromagnetic, paramagnetic and residual particles, and disaggregating the cations and anions by utilizing ferromagnetic particles as a temporary mobile anode facing a strong cathode and paramagnetic particles as a weak catode. The disaggregated minerals form a dielectric layer on the strong cathode, which is extracted.

U.S. Pat. No. 6,679,988 discloses a water purification system for production of USP purified water and/or USP water for injection including a backwashable, chlorine tolerant microfilter or ultrafilter for initial filtration of the feed water. The filtrate from the filter is provided to a dechlorinator prior to being subjected to an optional, reverse osmosis membrane unit and then to a still which discharges purified water at USP standards for purified water or water for injection.

U.S. Pat. No. 6,689,270 discloses a water treatment apparatus reducing hard water deposits in a conduit. Water having dissolved salts therein causing scaling is treated by flowing through a passage in an elongate tubular member. The tubular member has a first metal inside surface exposed to the water. A second metal surface is positioned therein and the two surfaces have areas of 1:1 up to about 125% with the second metal being different from the first metal. The metal surfaces are electrically insulated from each other so that current flow between the two is through the water.

U.S. Pat. No. 6,849,178 discloses an apparatus for water treatment by means of an electrical field is provided with an anode and a cathode in at least one treatment chamber through which the water to be treated passes. The apparatus is characterized in that the at least one treatment chamber forms a prismatic space with an elongated cross section, the anode and the cathode are formed by pairs of parallel, stick-shaped electrodes which extend spaced apart into said space and a voltage is applicable between the electrodes. One end of the at least one treatment chamber is connected to a water inlet and the other end of the at least one treatment chamber is connected to a water outlet, whereby a waterflow from one electrode to the other is generated, which is substantially transverse to the longitudinal axes of the electrodes.

SUMMARY OF THE INVENTION

The present invention provides methods and systems for enhancing quality of liquid solutions by generating a generally high concentration of low zeta potential mineral crystals in the liquid solutions. The inventive system treats source liquid in a low zeta potential crystal generator, thereby changing the crystalline structure of minerals such as calcium carbonate ($CaCO_3$) in the solution, and enhancing the concentration of low zeta potential crystals in the treated liquid. The source liquid solution is preferably water, but other aqueous solutions may be used as source liquids. The treated liquid solution, containing a high concentration of low zeta potential crystals, is next passed through at least one filtration device, whereby bacteria, virus, cysts, and other types of impurities and particles are substantially removed from the treated liquid. The treated and filtered liquid is then distributed for use and consumption in connection with livestock. Livestock are generally defined as domesticated mammals and vertebrates, or invertebrates raised for food or in the production of food. Examples of livestock include, but are not limited to, beef cattle, dairy cows, sheep, goats, horses, pigs, hogs, deer, buffalos, yaks, donkeys, mules, alpacas, bison, camels, llamas, dogs, elephants, rabbits, reindeers, chickens, turkeys, ducks, fish, and the like.

Low zeta potential crystal generators suitable for use in the present invention may comprise a passive electro mechanical device that catalyses the crystallization of minerals in liquid solutions. Zeta potential is the electrical potential that exists across the interface of all solids and liquids. Almost all particulate or macroscopic materials in contact with a liquid acquire charges on their surfaces. Zeta potential is an important and useful indicator of these charges and can be used to predict and control the stability of colloidal suspensions or emulsions. The lower the zeta potential, the more likely the suspension is to be stable because the charged particles repel one another and thus overcome the natural tendency to aggregate.

Calcium carbonate ($CaCO_3$) is generally present in at least moderate concentrations in water. In methods and systems of the present invention, calcium carbonate ionic species in the source liquid solution are crystallized to produce aragonite.

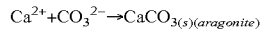

$$Ca^{2+}+CO_3^{2-}\rightarrow CaCO_{3(s)(aragonite)}$$

Aragonite is a common carbonate mineral and a polymorph of calcite. In other words, aragonite has the same chemistry as calcite but it has a different structure, and more importantly, different symmetry and crystal shapes. Aragonite's more compact structure is composed of triangular carbonate ion groups ($CO_3$), with a carbon at the center of the triangle and the three oxygens at each corner. Unlike calcite, the carbonate ions of an aragonite do not lie in a single plane pointing in the same direction. Instead, they lie in two planes that point in opposite directions, thereby destroying the trigonal symmetry that is characteristic of calcite's structure. Aragonite crystal formation and the conditions of the aragonite crystal growth are such that cations other than calcium are entrapped within the crystal lattice. This condition modifies the distribution of the charge at the surface of the crystals and lowers the zeta potential of the crystals. Minerals other than calcium carbonate may also be induced to form low zeta potential crystals.

One exemplary low zeta potential crystal generator suitable for use in methods and systems of the present invention is known as the "Turbu-Flow™", treatment system. The Turbu-Flow™ system is well known in the art and is described, for example, in Australia Patent No. 580474. The principle by which the Turbu-Flow™ system operates is a surface electro-chemical reaction between the crystalline particles which exist in a source liquid and the special alloy elements forming the core of the Turbu-Flow™ system.

The Turbu-Flow™ treatment system comprises a stack of metal alloy conditioning discs. The liquid flow path through the unit maximizes turbulent flow over the surfaces of the conditioning elements. The discs are constructed of metal alloys selected from two groupings of metals of opposite electro-negativity. When an ion-laden liquid solution contacts the elements, the ions are attracted onto the elements, causing them to become neutralized. The turbulence of liquid flow facilitates neutralization of the ionic species and removal of the ions as neutral particles in a harmless colloidal suspension.

The density of crystal seeds produced by a low zeta potential crystal generator such as the Turbu-Flow™ system is generally high, and the continued growth of the crystals formed in the treated liquid is prevented because of the rapid drop in the calcium (and other minerals) ion concentrations in the treated liquid. The crystals generated thus remain at a size in the range of nano size particles (generally from 1 to 999 nm). The Turbu-Flow™ system's effect on crystal structure and formation and the difference in low zeta potential crystal composition between untreated liquids and liquids treated with the Turbu-Flow™ system was not previously known.

In addition to observing that the zeta potential of crystals present in water treated by the Turbu-Flow™ system is substantially different from that of untreated water, it has been unexpectedly discovered the Turbu-Flow™ system is exceptionally effective in the enhancement of the quality and stability of the liquid solutions. Experimental results demonstrate that liquid solutions having a relatively high concentration of low zeta potential mineral crystals has the ability to reduce growth of various microorganisms in relatively low liquid temperatures.

The methods and systems of the present invention utilize a source liquid solution, such as municipal water, well water, and the like, containing minerals. In one embodiment, the source liquid may be treated prior to treatment in a low zeta potential crystal generator to remove contaminants such as debris, oils, and other substances that would interfere with the crystallization treatment. In another embodiment, the mineral composition of the source liquid may be determined prior to treatment of the liquid, and selected minerals may be added to the source liquid to facilitate and enhance crystal formation in the low zeta potential crystal generator.

The source liquid solution is treated by passage through the low zeta potential crystal generator to modify the crystal structure of minerals in the source liquid solution, providing treated liquid comprising a higher concentration of low zeta potential crystals than that found in the untreated source liquid. The low zeta potential crystals are preferably present in a relatively high concentration in the treated water and are small, preferably in the nano-size range. In a preferred embodiment, treatment of the source liquid in the low zeta potential crystal generator does not substantially alter the elemental composition of the source liquid. In a preferred embodiment, the concentration of elements such as barium, boron, calcium, copper, iron, magnesium, potassium, sodium, and the like in the untreated source liquid is substantially the same as the concentration of those elements in the treated liquid, although the concentration of low zeta potential crystals in the treated liquid is substantially higher than the concentration of low zeta potential crystals in the untreated source liquid.

In one embodiment, the source liquid treated by the low zeta potential crystal generator, such as the Turbu-Flow™ system, containing a high concentration of low zeta potential crystals, is passed through at least one filtration device, whereby bacteria, viruses, cysts, and the like are substantially removed from the treated liquid. Any filtration devices known in the art may be used and incorporated in the inventive system. Filtration devices may include, but are not limited to, particle filters, charcoal filters, reverse osmosis filters, active carbon filters, ceramic carbon filters, distiller filters, ionized filters, ion exchange filters, ultraviolet filters, back flush filters, magnetic filters, energetic filters, vortex filters, chemical oxidation filters, chemical additive filters, Pi water filters, resin filters, membrane disc filters, microfiltration membrane filters, cellulose nitrate membrane filters, screen filters, sieve filters, or microporous filters, and combinations thereof. The treated and filtered liquid may be stored or distributed for use and consumption in connection with livestock farming operations.

In another embodiment, the treated source liquid, before it reaches a filtration device, is passed through a pre-filtration system, whereby minerals, such as iron, sulfur, manganese, and the like, are substantially removed from the treated source liquid. The treated and pre-filtered liquid, containing a high concentration of low zeta potential crystals, is then passed through at least one filtration device, whereby bacteria, viruses, cysts, and the like are substantially removed from the treated and pre-filtered liquid.

In yet another embodiment, the source liquid is treated by a first low zeta potential crystal generator. The treated liquid is next passed through an optional pre-filtration system and at least one filtration device. The treated and filtered liquid may be distributed to and stored in a storage container, such as a reservoir. Before distribution of the stored treated and filtered liquid, the stored liquid is passed through a second low zeta potential crystal generator, whereby additional low zeta potential crystals are generated. The twice treated and filtered liquid is then distributed for use and consumption in connection with livestock, farming operations.

Source liquid treated and filtered by the inventive system is extremely effective in destroying or reducing growth of cells, pathogens, viruses, bacteria, fungi, spores, and molds, as well as enhancing the overall quality of the source liquids. The low zeta potential crystal generator, for example, the Turbu-Flow™ system, may be integrated with various liquid systems to treat many types of source liquid. These liquid systems may include, but are not limited to, agricultural farm systems, livestock farm systems, animal farm systems, fowl farm systems, fish farming operations, and the like.

BRIEF DESCRIPTION OF THE DRAWINGS

The present invention will be described in greater detail in the following detailed description, with reference to the accompanying drawings, wherein.

DETAILED DESCRIPTION OF THE INVENTION

The system of the present invention may be constructed in a variety of different embodiments and may be employed in connection with enhancing the overall quality of liquid solutions. Water sources, such as municipal water sources, well water, spring water, and the like may be used as source liquid for the inventive system and treated to modify the crystal structure of minerals in the source liquid to produce treated liquid having a high concentration of low zeta potential crystals. This treated liquid is highly effective in destroying microorganisms present in the liquid solutions.

The inventive system effectively reduces or eliminates microbial populations in the source liquid without changing the elemental composition of the source liquid and without requiring the use of toxic or harmful additives. The system and process may be implemented in a stationary, installed unit, or in a portable unit. The inventive system may also be retrofit in existing water distribution systems. Although several specific embodiments are described, it will be apparent that the invention is not limited to the embodiments illustrated, and that additional embodiments may also be used.

Figure 1:
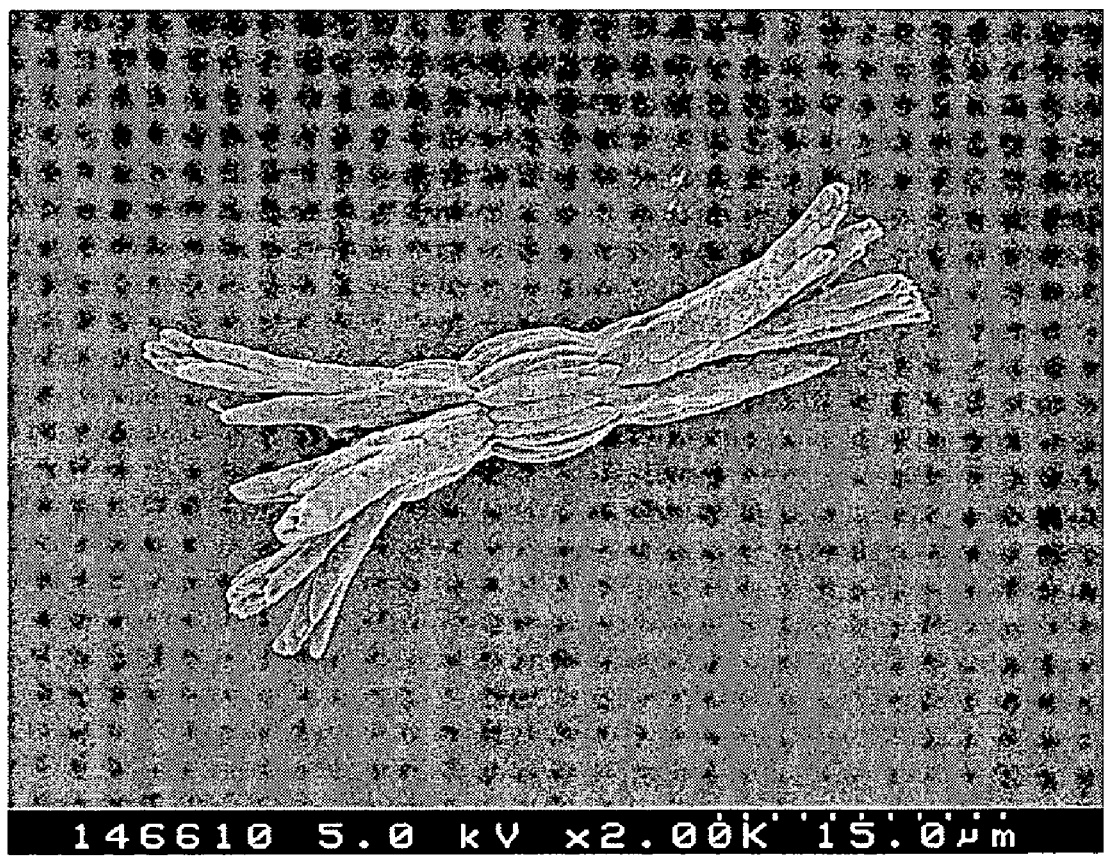
FIG. 1 shows a scanning electronic microscope (SEM) image of a calcium carbonate crystal obtained from untreated water.
Figure 2:
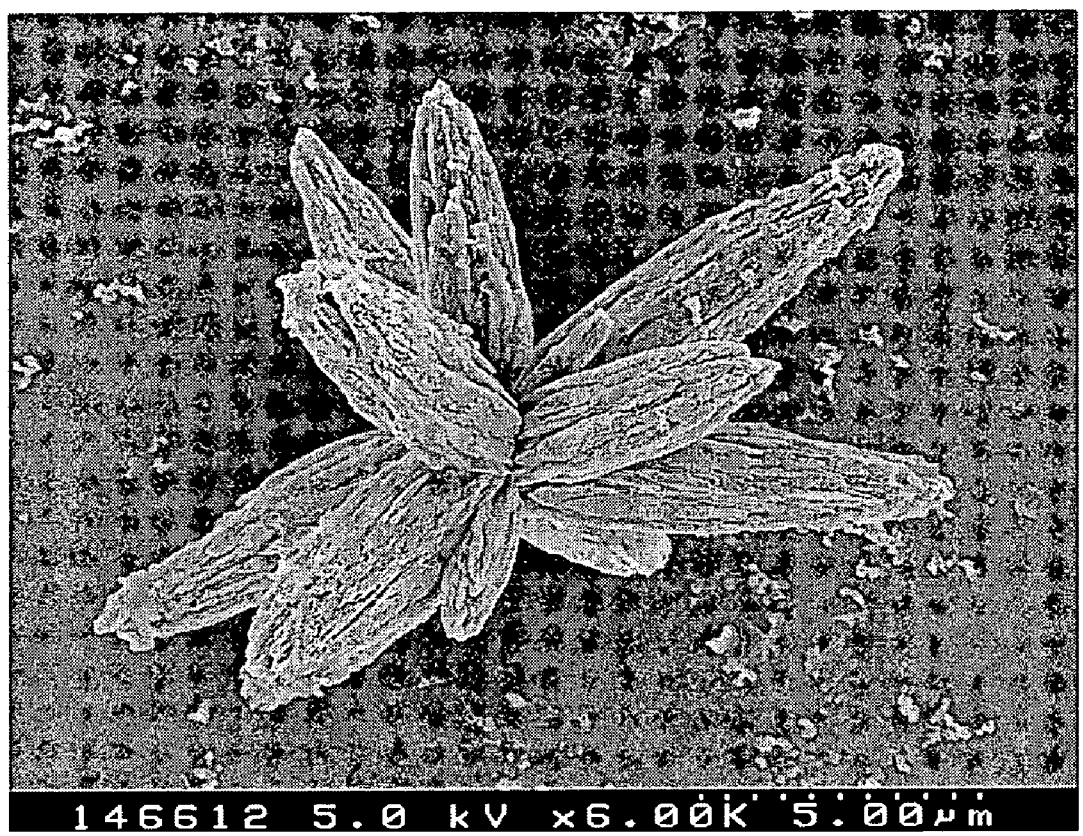
FIG. 2 shows an SEM image of a calcium carbonate crystal obtained from water treated in a Turbu-Flow™ system.

The inventive system incorporates a treatment module comprising a low zeta potential crystal generator. The low zeta potential mineral crystals produced after passage of source liquid through the low zeta potential crystal generator of the inventive system are of a different structure and nature than the mineral crystals present in untreated liquid sources. FIG. 1 shows a scanning electron microscope (SEM) image of a calcium carbonate crystal obtained from an untreated water sample, and FIG. 2 shows an SEM image of a calcium carbonate crystal obtained from water following treatment in a Turbu-Flow™ system. The crystal structure of the calcium carbonate crystal (aragonite) obtained from water treated in a low zeta potential crystal generator, such as the Turbu-Flow™ system, is dramatically different from the crystal structure of calcium carbonate in the untreated water sample, as evidenced by the images of crystals in the untreated and treated water samples.

Zeta potential is a measurement of the electrical voltage difference between the surface of colloids and its suspending liquid. Zeta potential, measured generally by video under an electron microscope, is related to the actual speed of charged mineral particles in water traveling between an anode and cathode electrode in a direct electrical current field. Zeta potential is thus a direct measurement of electrophoretic mobility (EM). In general, electrophoretic mobility is expressed as microns/second per volts/centimeter. The first term, microns per second, is a velocity measurement. The second term, volts per centimetre, is an expression of the electric field strength. Electrophoretic mobility is, therefore, a relative measure of how fast a charged mineral particle in water moves in an electrical current field.

Zeta potential can be calculated from the measured electrophoretic mobility using a theoretical relation between the two that is dependent on the dielectric constant and the viscosity of the suspending liquid. Zeta potential is generally expressed in millivolts (mV) and generally measures between a range of 0 and +100 mV or 0 and −100 mV. The "plus" or "minus" signs of zeta potential measurements represent the positive or negative traveling direction of the particles in water, respectively, and do not relate to the actual value of the zeta potential. In other words, the value of zeta potential is irrespective of its "sign". Typical zeta potential of mineral particles in water measures between about −13 mV and −25 mV. The zeta potential of mineral crystals following treatment of the water in a low zeta potential crystal generator generally demonstrates a reduction of value towards 0 mV and measures between about 0 mV and −10 mV.

Figure 3:
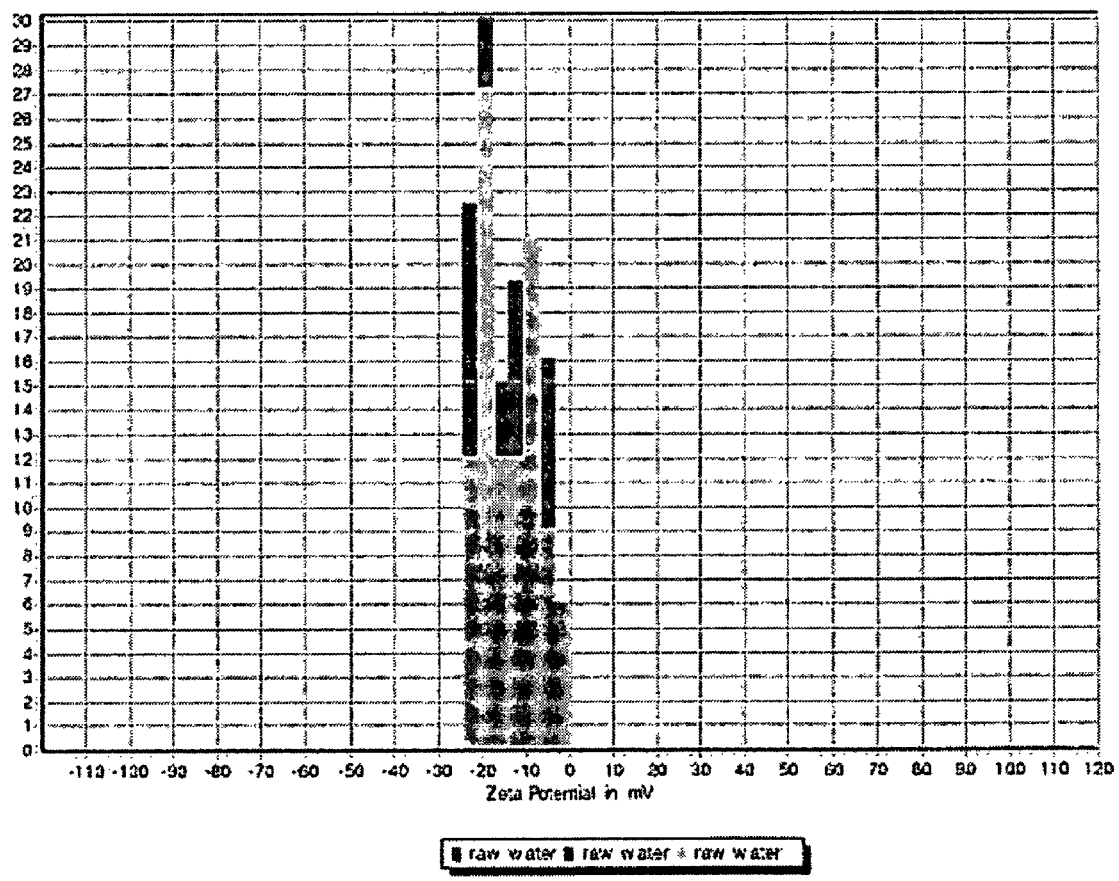
FIG. 3 shows measurement results of zeta potential of particles in untreated water.
Figure 4:
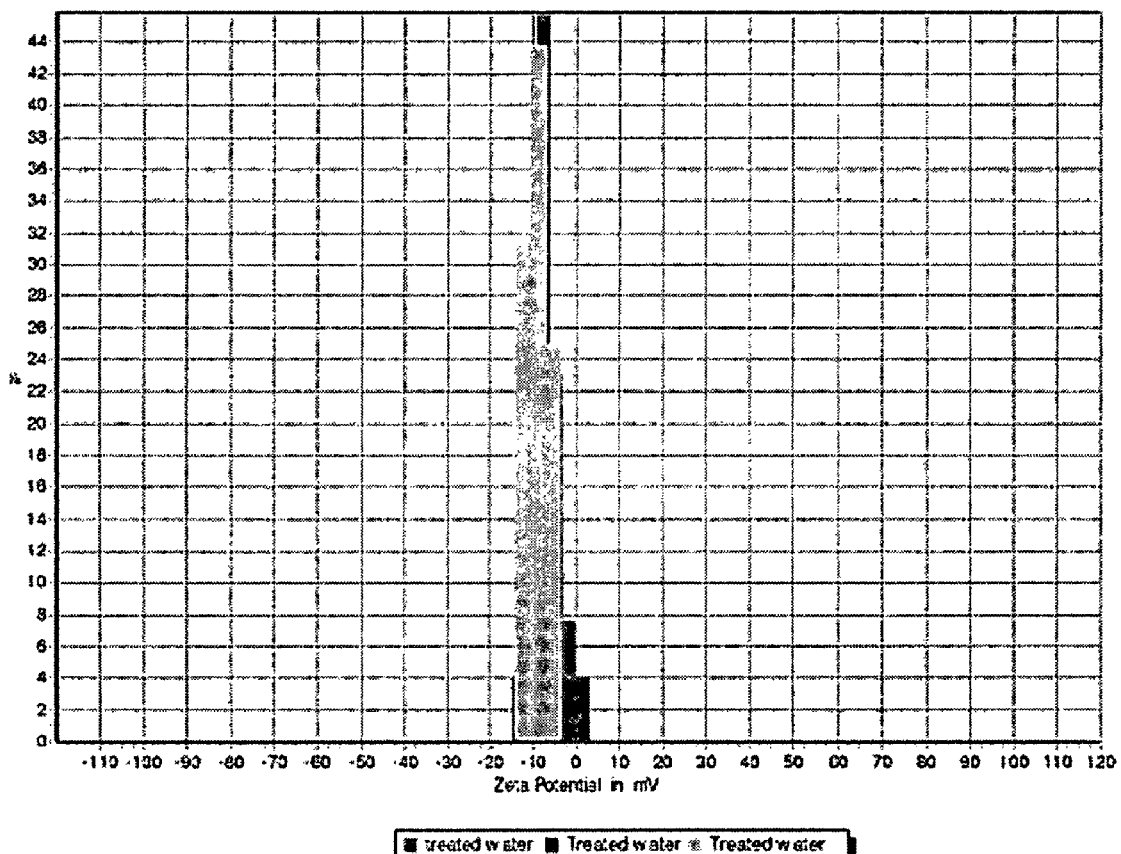
FIG. 4 shows measurement results of zeta potential of particles in water treated in a Turbu-Flow™ system.

In one study, the zeta potential of mineral particles in untreated water and water from the same source treated by passage through a Turbu-Flow™ low zeta potential crystal generator was measured and compared. Results of the measurements are shown in FIG. 3 (untreated water) and FIG. 4 (treated water). The zeta potential of mineral particles in untreated water was measured, in three samples, as −14.50 mV, −14.65 mV and −13.53 mV. The zeta potential of mineral crystals in water from the same source following treatment by passage through a Turbu-Flow™ system was measured, in three samples, as −7.41 mV, −7.27 mV, and −8.84 mV. The study demonstrates that mineral particles in untreated water generally has a zeta potential measurement between a range of about −12 mV and −15 mV, and passage of the untreated water through a low zeta potential generator such as the Turbu-Flow™ system results in treated water containing mineral crystals that generally have a zeta potential measurement between a range of about −4 mV and −10 mV.

Thus, passage of water through a low zeta potential generator such as the Turbu-Flow™ system reduces the zeta potential of mineral particles by about 20% to 60%. In another embodiment, passage of water through a low zeta potential generator such as the Turbu-Flow™ system reduces the zeta potential of mineral particles by 25%. In yet another embodiment, passage of water through a low zeta potential generator such as the Turbu-Flow™ system reduces the zeta potential of mineral particles by 30%. In yet another embodiment, passage of water through a low zeta potential generator such as the Turbu-Flow™ system reduces the zeta potential of mineral particles by 40%. In still another embodiment, passage of water through a low zeta potential generator such as the Turbu-Flow™ system reduces the zeta potential of mineral particles by 50%. In an alternative embodiment, passage of water through a low zeta potential generator such as the Turbu-Flow™ system reduces the mineral potential of mineral particles by 60%.

The source liquid solution to be treated in the low zeta potential crystal generator is preferably mildly "hard", and more preferably quite "hard." That is, the concentration of calcium carbonate in the source liquid solution is relatively high. The source liquid solution also preferably contains trace amounts of elements including, but are not limited to, Calcium, Titanium, Vanadium, Chromium, Manganese, Iron, Cobalt, Nickel, Copper, Zinc, Molybdenum, Silver, Cadmium, Gold, Platinum, and the like. If the source liquid is deficient in any desired mineral or elemental constituent, minerals and elemental constituents may be added to the source liquid prior to treatment in the low zeta potential crystal generator.

The currently preferred device for generating low zeta potential crystals is the "Turbu-Flow™" system, which is described above. Other devices for changing the zeta potential of crystals are known in the art or may be developed and used in methods and systems of the present invention.

Figure 5:
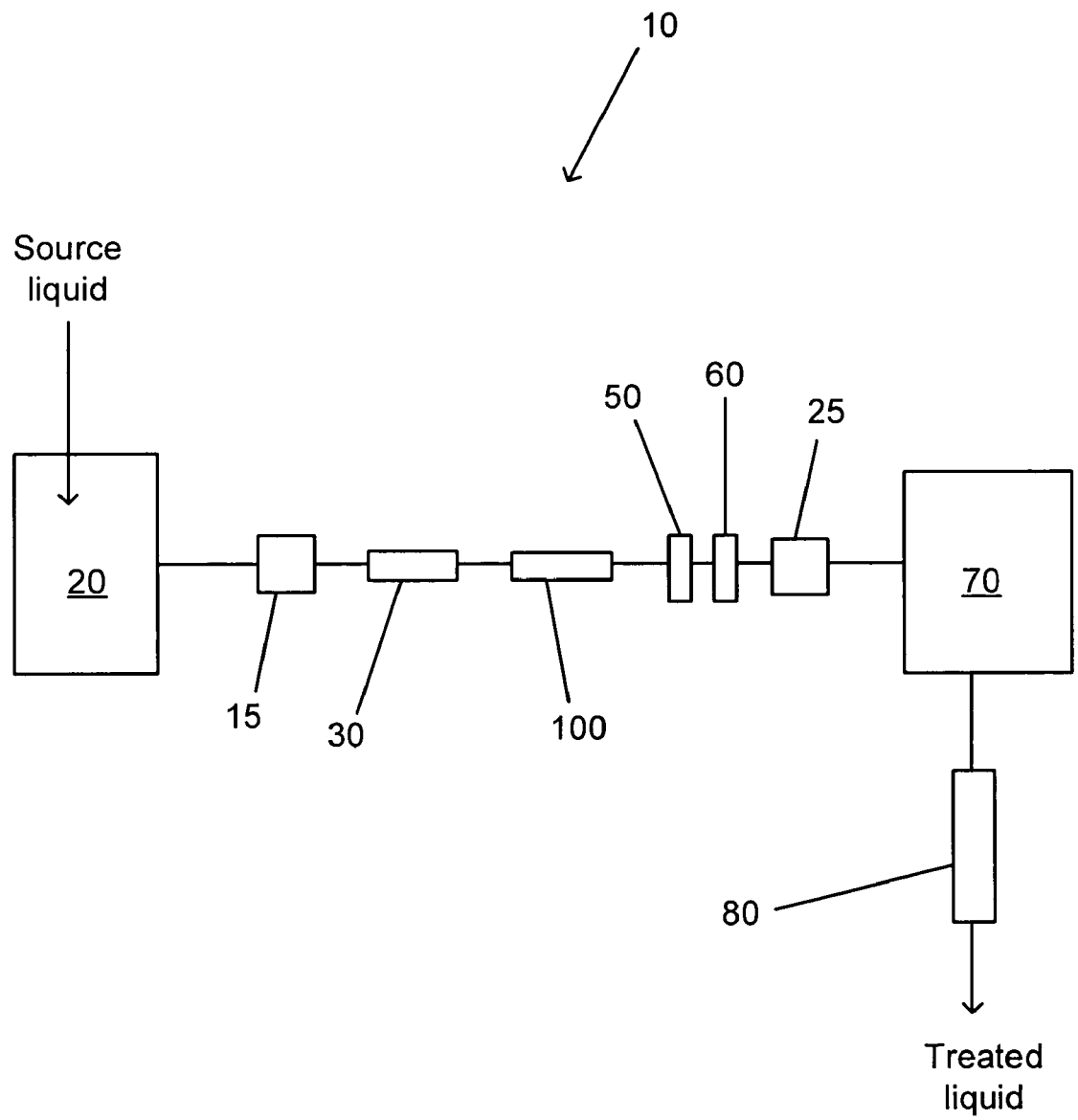
FIG. 5 shows an embodiment of the inventive liquid system for enhancement of the quality of liquid solutions.

FIG. 5 shows an embodiment of a treatment system 10 for enhancing of the quality of a liquid source material, comprising an optional source liquid pre-treatment system 15, a first low zeta potential crystal generator 30, an optional high zeta potential crystal generator 100, an optional pre-filtration system 50, at least one filtration device 60, and an optional second low zeta potential crystal generator 80. Pre-treatment system 15, low zeta potential crystal generator 30, high zeta potential crystal generator 100, pre-filtration system 50, filtration device 60, and second low zeta potential crystal generator 80 are in liquid communication with one another and are connected by way of a conduit system. The conduit system may include, for example, pipes, hoses, tubes, channels, and the like.

Treatment system 10 uses source liquid solution having a concentration of calcium carbonate and/or other minerals sufficient to provide a source for generation of low zeta potential crystals. The source liquid solution, such as water, is supplied from any suitable source and may be stored in a reservoir 20, or may be supplied continuously or intermittently from any source. The composition of source liquid may be tested and, if necessary, additional minerals and other constituents may be added to provide a sufficient source for generation of low zeta potential crystals. The source liquid may also be treated, prior or subsequent to holding in reservoir 20, in pre-treatment system 15 to substantially remove unwanted contaminants that may interfere with the treatment process, such as debris, oil-containing constituents, and the like.

Source liquid may be added continuously or intermittently to liquid reservoir 20, and the liquid may be released using a passive system, or actively pumped, towards low zeta potential crystal generator 30. As described above, various systems are available for enhancing the zeta potential crystal concentration of liquids and any such systems may be used as low zeta potential crystal generator 30.

Treated liquid, after passage through low zeta potential crystal generator 30, contains a high concentration of low zeta potential crystals. In one embodiment, the zeta potential of mineral crystals in liquid following treatment in the low zeta potential crystal generator 30 is between 0 mV and −10 mV. In another embodiment, the zeta potential of mineral crystals in liquid following treatment in the low zeta potential crystal generator 30 is between −4 mV and −10 mV. In yet another embodiment, the zeta potential of mineral crystals in liquid following treatment in the low zeta potential crystal generator 30 is between −5 mV and −9 mV. The "plus" or "minus" signs of zeta potential measurements represent the positive or negative traveling direction of the mineral crystals, respectively, and do not relate to the actual value of the zeta-potential. In other words, the value of zeta potential is irrespective of its "sign".

The treated source liquid is next passed through at least one filtration device 60. In a preferred embodiment, filtration device 60 reduces or substantially eliminates bacteria, viruses, cysts, and the like. Any filtration devices known in the art may be used. Filtration device 60 may include, but not limited to, particle filters, charcoal filters, reverse osmosis filters, active carbon filters, ceramic carbon filters, distiller filters, ionized filters, ion exchange filters, ultraviolet filters, back flush filters, magnetic filters, energetic filters, vortex filters, chemical oxidation filters, chemical addictive filters, Pi water filters, resin filters, membrane disc filters, microfiltration membrane filters, cellulose nitrate membrane filters, screen filters, sieve filters, or microporous filters, and combinations thereof. The treated and filtered liquid may be stored or distributed for use and consumption in connection with livestock farming operations.

As shown in FIG. 5, before reaching the at least one filtration device 60, the treated liquid may optionally be passed through a high zeta potential crystal generator 100. High zeta potential crystal generators are known in the art and generally useful for prevention or reduction of scaling. In addition, high zeta potential crystal generator 100 keeps low zeta potential crystals generated by low zeta potential crystal generator 30 suspended in the treated liquid and will not reduce the zeta potential of the generated low zeta potential crystals. One known high zeta potential crystal generator 100 is the Zeta Rode system. The Zeta Rod® system increases zeta potential of crystals by electronically dispersing bacteria and mineral colloids in liquid systems, eliminating the threat of bio-fouling and scale and significantly reducing use of chemical additives. Colloids in liquid systems become components of the capacitor and receive a strong boost to their natural surface charge, altering double-layer conditions that govern particle interactions. Mineral scale formation is prevented as the Zeta Rod® system stabilizes the dispersion of colloidal materials and suspended solids, preventing nucleation and attachment of scale to wetted surfaces. Bacteria remain dispersed in the bulk fluid rather than attaching to surfaces, and cannot absorb nutrition or replicate to form slime and create foul odors. Existing biofilm hydrates excessively, loses bonding strength and disperses. Also, biological fouling, biocorrosion, and scale formation are arrested by the Zeta Rod® system.

Another known high zeta potential crystal generator 100 is the Sterling Water Anti-Scale Appliance manufactured by Sterling Water Systems, LLC, a subsidiary of Porta Via Water Company. As water passes through the Sterling Water Anti-Scale Appliance, an electrical current is discharged into the water, which decreases the water's surface tension and inhibits the formation of scale and hard water spots from appearing. The inhibition of scale formation is due to the increase of zeta potential of the treated water, which keeps mineral particles from coming in contact with one another.

As shown in FIG. 5, after passage through low zeta potential crystal generator 30 and the optional high zeta potential crystal generator 100, and before reaching the at least one filtration device 60, the treated liquid may optionally be passed through pre-filtration system 50, wherein minerals, such as iron, sulphur, manganese, and the like are substantially removed from the treated source liquid. Pre-filtration system 50 can be, for example, a stainless steel mesh filter. The treated and pre-filtered source liquid, is next passed through the at least one filtration device 60, wherein bacteria, viruses, cysts, and the like are substantially removed from the treated liquid.

In the embodiment shown in FIG. 5, pump 25 is provided downstream from low zeta potential crystal generator 30 and treated and filtered liquid is released an distributed intermittently or continuously for various liquid system applications. Pump 25 may alternatively be provided upstream from low zeta potential crystal generator 30. The low zeta potential crystals generated by low zeta potential crystal generator 30 do not settle readily and generally stay in suspension for a long period, even without agitation of the solution.

The treated and filtered liquid, containing a high concentration of low zeta potential crystals, may be distributed to and stored in a storage container 70, such as a reservoir. In this embodiment, before distribution of the stored treated and filtered liquid, the stored liquid may be passed through a second low zeta potential crystal generator 80, for generation of additional low zeta potential crystals in the treated and filtered source liquid. The twice treated and filtered liquid may then be distributed for use and consumption in connection with livestock farming operations.

Figure 6:
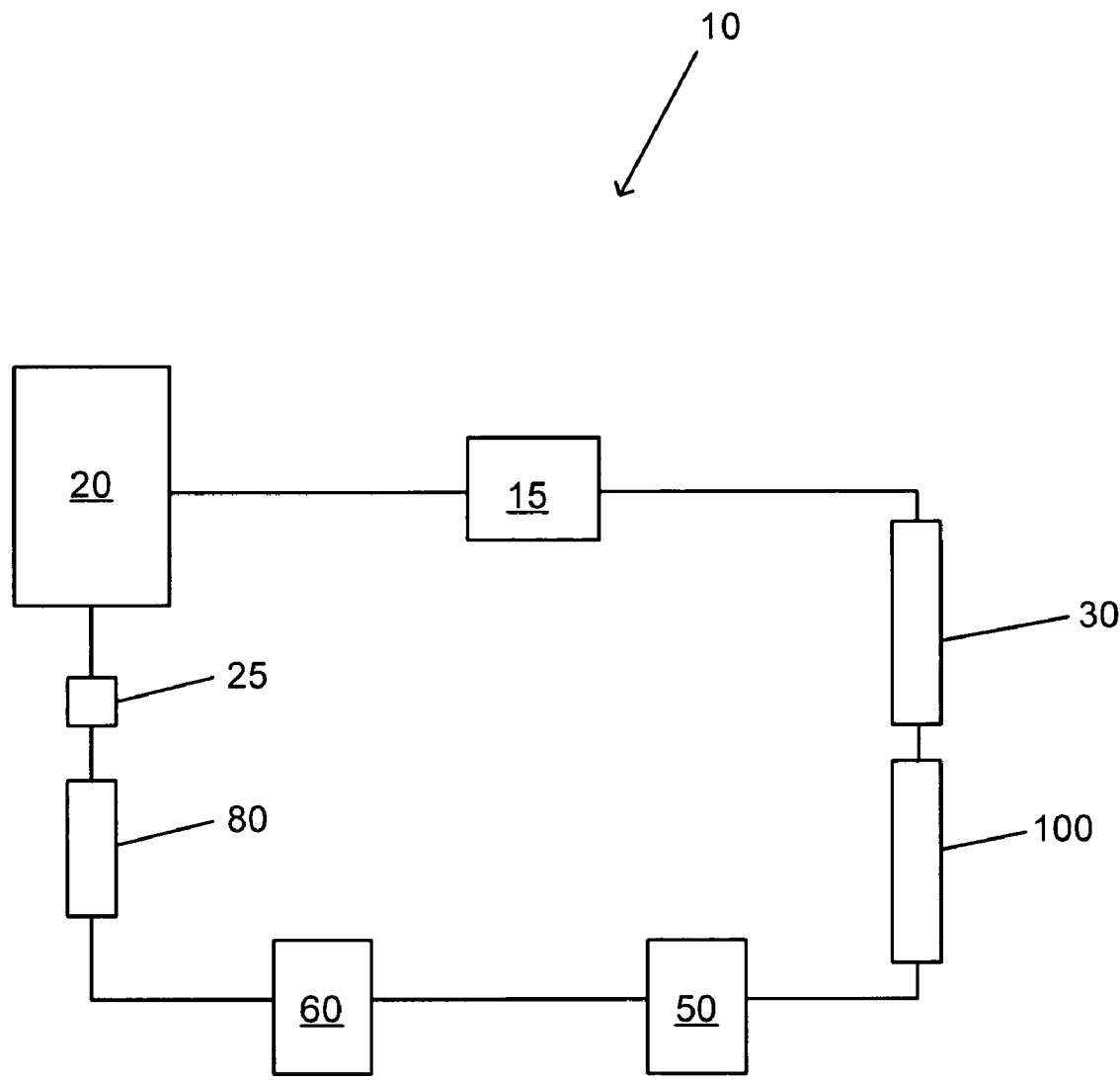
FIG. 6 shows another embodiment of the inventive liquid system for enhancement of the quality of liquid solutions.

FIG. 6 shows still another embodiment of the inventive system 10. The system 10 comprises a source reservoir 20 that houses the source liquid, an optional source liquid pre-treatment system 15, a first low zeta potential crystal generator 30, an optional high zeta potential crystal generator 100, an optional pre-filtration system 50, at least one filtration device 60, and an optional second low zeta potential crystal generator 80. Pre-treatment system 15, low zeta potential crystal generator 30, high zeta potential crystal generator 100, pre-filtration system 50, filtration device 60, and second low zeta potential crystal generator 80 are in liquid communication with one another and are connected by way of a circulating conduit system. Examples of source reservoir 20 may include, but are not limited to, fish tanks, cooling towers, water tanks, contained aquaculture ponds, aquariums, industrial water supply reservoirs, garden ponds, and the like. Source liquid may be stored or added continuously or intermittently to source reservoir 20, and the source liquid may be released using a passive system, or pumped, towards low zeta potential crystal generator 30, where low zeta potential mineral crystals are generated. Alternatively, the source liquid may be treated, prior or subsequent to holding in source reservoir 20, in pre-treatment system 15 to remove unwanted contaminants that may interfere with the treatment process, such as oil-containing constituents.

In the embodiment shown in FIG. 6, source liquid stored in source reservoir 20, pre-treatment system 15, low zeta potential crystal generator 30, high zeta potential crystal generator 100, pre-filtration system 50, filtration device 60, second low zeta potential crystal generator 80, and pump 25 are connected in a loop-like manner by conduit system. Exemplary conduit systems may include, but are not limited to, pipes, hoses, tubes, channels, and the like, and may be exposed to the atmosphere or enclosed. This circulatory or loop-type connection provides continuous or intermittent circulation of the source liquid through source reservoir 20, pre-treatment system 15, low zeta potential crystal generator 30, high zeta potential crystal generator 100, pre-filtration system 50, filtration device 60, and second low zeta potential crystal generator 80.

Continuous or intermittent treatment of the source liquid by low zeta potential crystal generator 30 where low zeta potential mineral crystals are generated, and continuous filtration of treated source liquid by filtration device 60 where bacteria, viruses, cysts, and the like are substantially removed, eventually arrives at a point in time where the entire volume of the source liquid within the system 10 is treated by low zeta potential crystal generator 30 and filtered by filtration device 60. In other words, the entire inventive system 10 eventually comes to an equilibrium-like state, where the entire volume of the liquid within the system 10 is treated to generate low zeta potential mineral crystals and the treated liquid is filtered to substantially eliminate harmful substances. The low zeta potential mineral crystals generated by low zeta potential crystal generator 30 generally settle in a low turbulence area of source reservoir 20 over time. The settling crystals form a layer of soft deposit that can be readily cleaned or removed from the system 10.

Before passing through filtration device 60, the treated liquid, containing a high concentration of low zeta potential crystals, may optionally be passed through high zeta potential crystal generator 100 for generating high zeta potential crystals to substantially remove minerals that can cause the formation of scale.

Treated liquid, after passage through low zeta potential crystal generator 30 and the optional high zeta potential crystal generator 100, may be passed through pre-filtration system 50, wherein minerals, such as iron, sulphur, manganese, and the like are substantially removed from the treated source liquid.

In an alternative embodiment, as shown in FIG. 6, after passage through filtration device 60, treated and filtered liquid may be passed through an optional second low zeta potential crystal generator 80 for generating additional low zeta potential mineral crystals. In this embodiment, the continuous and intermittent treatment of the source liquid by the first low zeta potential crystal generator 30 and second low zeta potential crystal generator 80, and the continuous filtration of treated source liquid by filtration device 60, eventually arrives at a point in time where the entire volume of the source liquid within the system 10 is treated by first low zeta potential crystal generator 30, second low zeta potential crystal generator 80, and filtered by filtration device 60.

It has also been observed that liquid treated by the inventive system stops and reverses the growth of biofilm. It is thought that the change in crystal structure leaves no place to the microorganisms to attach. Also, the change in zeta potential modifies the interaction between particles and cell membrane because the nano size low zeta potential crystals could cross the cell membrane of the micro organisms and destroy the cell.

It has further been observed that water treated by the inventive system prevents the growth of iron bacteria in the treated source liquid. Iron bacteria are known to cause "clogging" of most filtration devices.

Applications of the Inventive System

The inventive system equipped with a low zeta potential crystal generator 30 may be used to eliminate bacteria and microorganisms and enhance the over quality of liquid in a number of liquid systems.

Water Filtration Systems

Water filtration systems equipped with the Turbu-Flow™ system are capable of converting mineral ions to nano size low zeta potential mineral crystals, resulting in an ultra filtration system for the removal of minerals, such as calcium, in water systems for use with livestock farming operations. The Turbu-Flow™ system has also been found to achieve superior reverse osmosis membrane performances due to the lower zeta potential mineral crystals in the treated water. The treated minerals in the treated water solutions increase the efficiency of coagulation and flocculation. Flocculants and coagulants are normally chemical compounds such as poly-electrolytes, ferric sulphate, aluminium sulphate, which are used in various clarification processes that often involve dissolved air flotation devices of various designs. The advantage of the treated water in water systems for use with livestock, animal, fowl, and fish farming operations is use of less chemical and better process, which increases water filtration efficiency.

In addition, it has been unexpectedly discovered that iron $FE_3$ can be converted to Iron $FE_2$ at low levels in water treated in a low zeta potential crystal generator, which greatly improves oil and water separation due to the lower surface tension of the treated water. Furthermore, it has been found that bacteria and microorganisms present in treated water are converted to nano-size low zeta potential mineral crystals, which can be readily cleaned or removed from the water filtration system.

A low zeta potential crystal generator may be integrated with any filtration device 60 known in the art as described above. Most of the filtration devices 60 effectively block and remove particles larger than 0.04 microns. Thus, dissolved salts and essential minerals freely pass through filtration devices 60. In one example, filtration device 60 contains thousands of ultrafiltration hollow fibre membrane strands. Each membrane strand contains billions of microscopic pores. Water pressure pushes water molecules through these pores towards the hollow center of the membrane, while blocking out larger contaminants such as bacteria, parasites, and viruses. Filtered water then flows through each fibre and is distributed for use and consumption. Unwanted particles and microorganisms are flushed out of the system during the daily automatic self-cleaning cycle.

EXAMPLE 1

Chemical Analysis of Untreated and "Turbu-Flow™" Treated Water

A chemical analysis comparing the wet chemistry and elemental metal composition of untreated water and water treated with a Turbu-Flow™ low zeta potential generator is shown below in Table 1. The instrument detection limits are also provided. According to the results shown in Table 1, very little change can be detected in Turbu-Flow™ treated water, except that an increase in turbidity (a measure of the cloudiness of water caused by suspended particles) is observed.

TABLE 1

|  |  | Instrument Detection Limit | Untreated Water | Treated Water |
|---|---|---|---|---|
| Wet Chem. | Conductivity (us/cm) | 3 | 720 | 720 |
|  | pH (pH units) | 0.1 | 7.8 | 7.7 |
|  | Turbidity (NTU) | 0.10 | 0.30 | 0.50 |
| Metals | Aluminum (mg/L) | 0.01 | 0.02 | 0.02 |
|  | Barium (mg/L) | 0.01 | 0.08 | 0.08 |
|  | Beryllium (mg/L) | 0.001 | <0.001 | <0.001 |
|  | Boron (mg/L) | 0.05 | <0.05 | <0.05 |
|  | Cadmium (mg/L) | 0.0001 | <0.0001 | <0.0001 |
|  | Calcium (mg/L) | 0.5 | 84 | 85 |
|  | Chromium (mg/L) | 0.001 | 0.001 | 0.001 |
|  | Cobalt (mg/L) | 0.0008 | <0.0008 | <0.0008 |
|  | Copper (mg/L) | 0.001 | 0.059 | 0.052 |
|  | Iron (mg/L) | 0.05 | 0.11 | 0.11 |
|  | Lead (mg/L) | 0.001 | <0.001 | <0.001 |
|  | Magnesium (mg/L) | 0.5 | 20 | 20 |
|  | Manganese (mg/L) | 0.001 | 0.004 | 0.004 |
|  | Molybdenum (mg/L) | 0.001 | <0.001 | <0.001 |
|  | Nickel (mg/L) | 0.002 | <0.002 | <0.002 |
|  | Potassium (mg/L) | 0.5 | 1.9 | 1.9 |
|  | Silver (mg/L) | 0.0001 | <0.0001 | <0.0001 |
|  | Sodium (mg/L) | 0.5 | 19 | 20 |
|  | Strontium (mg/L) | 0.001 | 0.24 | 0.24 |
|  | Thallium (mg/L) | 0.0003 | <0.0003 | <0.0003 |
|  | Uranium (mg/L) | 0.005 | <0.005 | <0.005 |
|  | Vanadium (mg/L) | 0.001 | 0.003 | 0.003 |
|  | Zinc (mg/L) | 0.003 | 0.004 | 0.004 |
|  | Zirconium (mg/L) | 0.001 | <0.001 | <0.001 |

EXAMPLE 2

Kill Time Study

The following table illustrates the kinetics of the destruction of microorganisms using the Turbu-Flow™ system. This example shows that regular tap water treated by the Turbu-Flow™ system results in an equivalent level of decontamination as sterile, deionized water.

Inoculum Preparation:

Cultures of *S. aureus* ATCC #6538 and *L. monocytogenes* ATCC #19111 were transferred from stock cultures to individual tubes of Soybean casein digest broth (SCDB) media. Cultures were incubated at 30-35° C. for 24-48 hours.

*A. niger* ATCC #16404 was inoculated onto Sabouraud dextrose agar (SDEX) and incubated at 20-25° C. for 6-10 days. *A. niger* was harvested by removing the mycelial mats from the surface using a sterile spatula. The mycelia were placed into a sterile funnel containing moist cotton and rinsed with SALT, a solution of 0.9% saline with 0.05% Tween. Organism concentration was adjusted in Physiological Saline Solution (PHSS) to produce a challenge level of approximately $10^{6-7}$ CFU/mL using visual turbidity.

*A. niger* is a fungus commonly found on textiles, in soils, grains, fruits, and vegetables and is a common cause for skin, pulmonary, and ear infections. *S. aureus* is a spherical bacterium and a common inhabitant of human skin. *L. monocytogenes* is a gram-positive, motile, rod-shaped bacterium that is found principally in contaminated food products.

Sample Preparation:

Samples were tested as received without any additional dilution or manipulation.

Test Procedure:

Tubes containing 9 mL of each test sample were brought to 50+/−2° C. in a waterbath. One mL of the prepared test microorganism suspension was added to each tube containing the test sample to yield a minimum of $1 \times 10^5$ CFU/mL challenge organism. The samples were mixed by swirling. The tubes were placed back into the waterbath. At 50° C., 60° C., 70° C., 80° C., and 90° C. (all temperatures within +2° C.) exposure temperatures 1.0 mL aliquots of sample solution-cell suspension were removed and added to 9 mL of Letheen broth (LETH). The tubes were mixed thoroughly. Ten-fold serial dilutions were made in blanks containing 9 mL of LETH through the appropriate dilution. Triplicate aliquots were plated from selected dilutions onto Soybean casein digest agar (SCDA) for *S. aureus* and *L. monocytogenes* samples and SDEX for *A. niger* samples. Bacterial plates were incubated at 30-35° C. for 48-72 hours and mold plates were incubated at 20-25° C. for 3-7 days.

Positive Control:

Tubes were prepared containing 9 mL of sterile deionized water at 200 ppm hard water for each organism type. The tubes were equilibrated to 50+2° C. At T=0, 1 mL of test organism was added to the tube. Aliquots of the control were removed at the same temperature and relative time points as the test sample. Ten-fold serial dilutions were prepared in dilution blanks containing 9 mL of LETH. Triplicate aliquots were plated from selected dilutions onto Soybean casein digest agar (SCDA) for *S. aureus* and *L. monocytogenes* samples and SDEX for *A. niger* samples. Bacterial plates were incubated at 30-35° C. for 48-72 hours and mold plates were incubated at 20-25° C. for 3-7 days.

Acceptance Criteria:

Positive controls must demonstrate a titer of $\geq 10^5$ CFU/mL. Negative controls must not show any growth of the test organism.

Results:

The percent reduction and log reduction results in Table 2 show that tap water treated by the Turbu-Flow™ system has at least the equivalent ability to reduce growth of various fungi, bacteria and spores as deionized water. Negative controls did not show growth of the test microorganisms. The data as shown in Table 2 also demonstrates that tap water treated by the Turbu-Flow™ system has superior ability to reduce growth of microorganisms than that of deionized water at lower temperature (50° C.).

TABLE 2

| Organism | Temperature | Percent reduction | $Log_{10}$ reduction |
|---|---|---|---|
| *A. niger* | 50° C. | 47 | 0.28 |
| Treated water | 60° C. | 81 | 0.72 |
| | 70° C. | 99.9989 | 4.97 |
| | 80° C. | 99.9989 | 4.97 |
| | 90° C. | 99.9989 | 4.97 |

TABLE 2-continued

| Organism | Temperature | Percent reduction | $Log_{10}$ reduction |
|---|---|---|---|
| *A. niger* | 50° C. | 0 | 0 |
| Deionised water | 60° C. | 84 | 0.8 |
| (Control) | 70° C. | 99.9989 | 4.57 |
| | 80° C. | 99.9989 | 4.97 |
| | 90° C. | 99.9989 | 4.97 |
| *S. aureus* | 50° C. | 20 | 0.1 |
| Treated water | 60° C. | 56 | 0.36 |
| | 70° C. | 99.9956 | 4.36 |
| | 80° C. | 99.99959 | 5.39 |
| | 90° C. | 99.99959 | 5.39 |
| *S. aureus* | 50° C. | 0 | 0 |
| Deionised water | 60° C. | 99.959 | 3.39 |
| (Control) | 70° C. | 99.99959 | 5.39 |
| | 80° C. | 99.99904 | 5.02 |
| | 90° C. | 99.99959 | 5.39 |
| *L. monocytogenes* | 50° C. | −310 | −0.61 |
| Treated water | 60° C. | 37 | 0.20 |
| | 70° C. | 99.989 | 3.97 |
| | 80° C. | 99.989 | 3.97 |
| | 90° C. | 99.989 | 3.97 |
| *L. monocytogenes* | 50° C. | 0 | 0 |
| Deionised water | 60° C. | 98.9 | 1.97 |
| (Control) | 70° C. | 99.989 | 3.97 |
| | 80° C. | 99.989 | 3.97 |
| | 90° C. | 99.989 | 3.97 |

EXAMPLE 3

Water Surface Tension Analysis

Samples of untreated water and water treated by passage through a Turbu-Flow™ system were generated and analyzed for surface tension at room temperature and at 80° C. The results of the analysis are summarized in Table 3.

TABLE 3

| | Untreated Water | | Turbu-Flow Treated Water | |
|---|---|---|---|---|
| Date | Room Temp | 80° C. | Room Temp | 80° C. |
| May 5, 2004 | 79.0 dynes/cm | na | 69.5 dynes/cm | na |
| May 25, 2004 | 79.1 dynes/cm | 69.2 dynes/cm | 77.4 dynes/cm | 67.5 dynes/cm |

Table 3 shows a dramatic decrease in water surface tension after a single pass through the Turbu-Flow™ system. The sample was analyzed approximately one week later. Based on a one-week-old sample, the surface tension dropped from 79.0 dynes/cm in the untreated water to 69.3 dynes/cm in the water treated by the Turbu-Flow™ system.

To further delineate the impact of time and temperature on the surface tension, the analysis was repeated almost three weeks later. At this time, the treated water sample exhibited only a slight decrease in surface tension over the untreated water at both room temperature and at 80° C. This analysis demonstrates that water treated by the Turbu-Flow™ system will revert back to its original surface tension over time. The most significant findings of this experiment is that for a period of more than a week after the water sample is passed through the Turbu-Flow™ system, it exhibited a surface tension that is similar in magnitude to water that has been heated to 80° C.

Thus, the water treated by the Turbu-Flow™ system has the ability to cause microorganisms to be less heat-tolerant due to the lower surface tension of the treated water.

EXAMPLE 4

Comparison of Water Characteristics over Time

On Jul. 19, 2004, a sample of tap water treated by the Turbu-Flow™ system from Jun. 29, 2004 was submitted for analysis along with a tap water sample treated by passage through a Turbo-Flow™ system on Jul. 19, 2004. The results of these analyses are summarized in Table 4 below.

TABLE 4

|  | Treated - June 29 | Initial Tap Water July 19$^{th}$ | Treated - July 19$^{th}$ |
| --- | --- | --- | --- |
| pH (pH units) | 6.63 | 7.89 | 7.16 |
| Turbidity (NTU) | 0.91 | 0.17 | 0.45 |
| Colour - Apparent (TCU) | <1 | 1 | 5 |

The results in Table 4 demonstrate that water treated by the Turbu-Flow™ system collected on Jun. 29, 2004 had a significantly depressed pH compared to the untreated and treated samples of Jul. 19, 2004. Also, the turbidity and the color of the three week old treated water sample are higher than that of the untreated water. The increase in turbidity and color of a three week old water sample that was treated by the Turbu-Flow™ system had not been previously observed.

EXAMPLE 5

Redox (ORP) Analysis to Determine Effect of Chlorine Addition

ORP (Oxidation Reduction Potential) or Redox is used in pool water treatment as an indication of sanitation in relation to free chlorine parameter. ORP technology is found to be a reliable indicator of bacteriological water quality. It is generally necessary for water to have an ORP value of at least 700 mV to ensure good water quality.

Samples of untreated and tap water treated by the Turbu-Flow™ system were submitted to determine the effect of chlorine addition on both sample types. The results are presented in FIG. 7.

Figure 7:
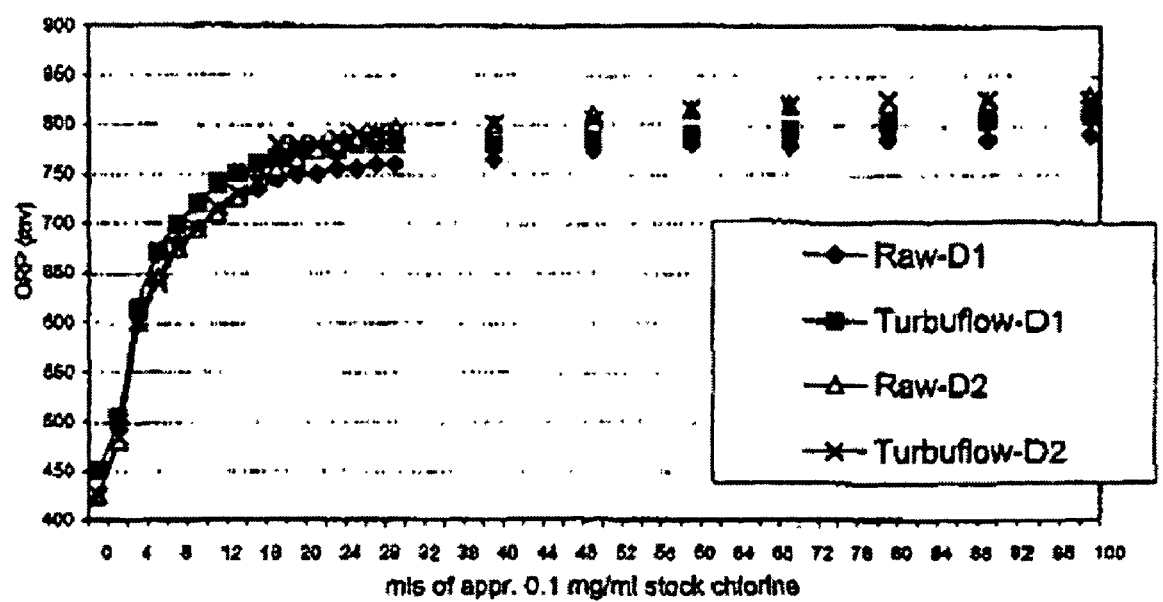
FIG. 7 shows results of a redox (ORP) analysis to determine effect of chlorine addition to untreated water and water treated by the Turbu-Flow™ system.

FIG. 7 shows that on the day the samples were generated (Day 1 or D1 on the graph), the water treated by Turbu-Flow™ system required less of the standard chlorine solution to achieve an elevated ORP. FIG. 7 also shows that, by the next morning, both the untreated and treated samples were comparable to the results of the treated samples from Day 1. Furthermore, other that a slight difference in the early stages, both Day 2 samples exhibited almost identical ORP response to chlorine addition.

EXAMPLE 6

Study on the Effect of Turbu-Flow™ System on Iron Precipitation and Biofilm Formation This example illustrates a study on the effect of the Turbu-Flow™ system on calcium carbonate deposition by measured the size of the calcium carbonate crystals in water before and after treatment through a Turbu-Flow™ system. The results showed that one of the observed crystals had changed from a typical calcite to an aragonite structure. Chemical analysis of various metals, conductivity, and pH had shown no measurable difference between the raw and Turbu-Flow™ treated water. However, the turbidity had increased from 0.3 to 0.5 NTU, which was attributed to the restructuring of the calcium carbonate crystals. The study also observed that water treated with the Turbu-Flow™ system had eliminated biofilm growth.

Methodology

A specific sampling and analytical methodology was developed to evaluate the performance of the Turbu-Flow™ units for each of the areas of concerns; calcium carbonate deposition, iron precipitation, and biofilm growth.

Calcium Carbonate Deposition

To measure the effect of the Turbu-Flow™ unit on calcium carbonate deposition in the water piping, water samples were collected upstream and downstream of the installed Turbu-Flow™ units and sent to a laboratory for analysis of total suspended solids (TSS). The total suspended solids (TSS) are defined as those particles that are larger than two microns based on standard methods. Based on the Turbu-Flow™ design information, the average crystal size downstream of the Turbu-Flow™ unit should be larger than those upstream of the unit, resulting in an overall increase of total suspended solids downstream of the Turbu-Flow™ unit.

Iron Precipitation

To evaluate the effect of the Turbu-Flow™ system on increasing iron precipitation, water samples were collected upstream and downstream of the installed Turbu-Flow™ units and analyzed for dissolved iron and ferrous iron ($Fe_2$). Furthermore, swab samples on the inside of the pipe surface were collected and analyzed for the presence or absence of iron bacteria. Dissolved iron is the total iron in solution larger than 0.45 microns based on standard methods. If the Turbu-Flow™ unit accelerates the precipitation of the iron, then there should be a reduction in the dissolved iron concentration subsequent to the Turbu-Flow™ unit. Similarly, there should be a reduction in the concentration of dissolved ferrous iron in solution subsequent to the Turbu-Flow™ unit.

Biosolids Growth

To evaluate the effect of the Turbu-Flow™ unit on inhibiting biofilm growth, swab samples on the interior surface of the pipe upstream and downstream of the Turbu-Flow™ unit were collected and analyzed for total aerobic bacteria plate count.

Sampling Program

Water and swab samples were collected upstream and downstream of Turbu-Flow™ units on Dec. 5 and 6, 2005 at 8 different locations, including 5 homes, a maple leave hatchery (MLH), and 2 farms. Additional swab samples from the inside the cartridge filters downstream of the Turbu-Flow™ units were also collected to determine if there was any biofilm growth. When two or more cartridge filter assemblies were present, samples from the first unit downstream of the Turbu-Flow™ were collected. Details on the specific number and type of samples collected from each location are presented in Table 5. Table 5 presents the results of total suspended solids in the water samples upstream and downstream of the Turbu-Flow™ units collected on Dec. 6 and 7, 2005.

TABLE 5

Total Suspended Solids for Water Samples Upstream and Downstream of the Turbu-Flow ™ Units

| Location | Total Suspended Solids (mg/Location L) | |
| --- | --- | --- |
|  | Upstream | Downstream |
| Home 1 | 6 | 6 |
| Home 2 | <1 | <1 |
| Home 3 | <1 | 2 |

TABLE 5-continued

Total Suspended Solids for Water Samples Upstream
and Downstream of the Turbu-Flow ™ Units

| Location | Total Suspended Solids (mg/Location L) | |
|---|---|---|
| | Upstream | Downstream |
| Home 4 | <1 | <1 |
| Home 5 | <1 | <1 |
| Farm 1 | 2 | 6 |
| Farm 2 | 6 | 6 |

On average, there was no measurable difference between the upstream and downstream water samples for total suspended solids (TSS), with the exception of Home 3 and Farm 1. At both these locations, there was a slight increase in the total suspended solids.

Table 6 presents the dissolved iron, ferrous iron, and iron bacteria results upstream and downstream of the Turbu-Flow™ units from the samples collected on Dec. 6 and 7, 2005. As shown in Table 6, both the dissolved and ferrous iron concentrations were measured below the laboratory analytical detection limit, with the exception of ferrous iron in Farm 2. The ferrous iron concentration increased subsequent to the Turbu-Flow™ unit. Therefore, the effect of the Turbu-Flow™ on accelerating iron flocculation cannot be determined. However, a significant result is that at locations upstream of the Turbu-Flow™ unit where the presence of iron bacteria was detected, there was an absence of iron bacteria downstream of the Turbu-Flow™ unit. This suggests that the Turbu-Flow™ inhibits iron bacteria formation.

TABLE 6

Dissolved Iron, Ferrous Iron, and Iron Bacteria in the Samples Collected
Upstream and Downstram of the Turbu-Flow ™ Units

| | Dissolved Iron mg/L | | Ferrous iron mg/L | | Iron Bacteria (presence/absence) | | |
|---|---|---|---|---|---|---|---|
| Location | Upstream | Downstream | Upstream | Downstream | Upstream | Downstream | Cartridge Filter |
| Home 1 | <0.02 | <0.02 | <0.05 | <0.05 | Absence | Absence | Absence |
| Home 2 | <0.02 | <0.02 | <0.05 | <0.05 | Presence | Absence | Absence |
| Home 3 | <0.02 | <0.02 | <0.05 | <0.05 | Presence | Absence | — |
| Home 4 | <0.02 | <0.02 | <0.05 | <0.05 | Absence | Absence | — |
| Home 5 | <0.02 | <0.02 | <0.05 | <0.05 | Presence | Absence | Absence |
| Farm 1 | <0.02 | <0.02 | <0.05 | <0.05 | Absence | Absence | Absence |
| Farm 2 | <0.02 | <0.02 | 0.24 | 0.72 | Absence | Absence | Absence |
| MLH | | | | | Presence | Absence | — |

Table 7 presents the results of the total aerobic bacteria plate count on the water piping both upstream and downstream of the Turbu-Flow™ unit from samples collected on Dec. 6 and 7, 2005.

TABLE 7

Aerobic Colony Count from Samples Collected Upstream
and Downstream of the Turbu-Flow ™ Units

| | Aerobic Colony Count CFU/swab | | |
|---|---|---|---|
| Location | Upstream | Downstream | Cartridge Filter |
| Home 1 | <10 | <10 | 200 |
| Home 2 | <10 | 20 | <10 |
| Home 3 | <10 | 390 | — |
| Home 4 | 180 | <10 | — |
| Home 5 | <10 | <10 | <10 |
| Farm 1 | 1900 | 4100 | 2100 |

TABLE 7-continued

Aerobic Colony Count from Samples Collected Upstream
and Downstream of the Turbu-Flow ™ Units

| | Aerobic Colony Count CFU/swab | | |
|---|---|---|---|
| Location | Upstream | Downstream | Cartridge Filter |
| Farm 2 | <10 | 2000 | — |
| MLH | 90 | <10 | — |

The results presented in Table 7 show that there is no consistent increase or decrease in the aerobic colony counts between the collected upstream and downstream swab samples.

CONCLUSIONS

The results of the sampling study showed that iron bacteria was found to be absent downstream of all of the Turbu-Flow™ unit where samples were collected. On average, there is no measurable difference between the upstream and downstream water samples for total suspended solids (TSS). There is no consistent increase or decrease of aerobic bacteria in the water pipes and cartridge filters downstream of the Turbu-Flow™ unit. Additional aerobic colony counts should measured at regular time intervals to identify if there is a sustained inhibition of biosolids growth and biofouling in the water pipes.

EXAMPLE 7

Chickens Fed by Treated and Filtered Water Containing a High Concentration of Low Zeta Potential Crystals Four lots of farm chickens were fed with water treated and filtered by the inventive system for about one month. After about one month, a number of chickens from each lot were selected to be condemned for various reasons. Among the chickens to be condemned, it was found that chickens fed with water treated and filtered by the inventive system had significantly low occurrences of cellulitis. Cellulitis is a type of bacterial infection of the skin, appearing as a swollen, red area of skin. Cellulitis may also affect the tissues underlying the skin and can spread to the bloodstream. The results of this study are shown below in Table 8.

Control results, where 8 lots of chickens were fed with regular, or untreated water, are shown in Table 9 below. Table 9 shows significantly higher occurrences of cellulitis among condemned chickens.

TABLE 8

| Lot # | No. of Chickens fed with treated and filtered water | No. Condemned | No. Cellulitis | % Condemned/ Total | % Cellulitis/ Total |
|---|---|---|---|---|---|
| 1 | 7,874 | 32 | 8 | 0.41 | 0.10 |
| 2 | 7,572 | 34 | 4 | 0.45 | 0.05 |
| 3 | 7,368 | 48 | 12 | 0.65 | 0.16 |
| 4 | 7,776 | 58 | 15 | 0.75 | 0.19 |

TABLE 9

| Lot # | No. of Chickens fed with untreated water | No. Condemned | No. Cellulitis | % Condemned/ Total | % Cellulitis/ Total |
|---|---|---|---|---|---|
| 1 | 7,980 | 145 | 92 | 1.82 | 1.15 |
| 2 | 7,600 | 112 | 56 | 1.47 | 0.74 |
| 3 | 7,968 | 107 | 51 | 1.34 | 0.64 |
| 4 | 8,928 | 148 | 106 | 1.66 | 1.19 |
| 5 | 7,224 | 144 | 66 | 1.99 | 0.91 |
| 6 | 7,875 | 88 | 58 | 1.12 | 0.74 |
| 7 | 8,085 | 83 | 19 | 1.03 | 0.24 |
| 8 | 8,262 | 102 | 27 | 1.23 | 0.33 |

This study generally showed that chickens fed with feed water produced according to the methods and systems of the present invention have significantly lower rates of morbidity and bacterial infection, as well as higher rates of survival and health, than that of chickens fed with untreated or "raw" water. It has also been observed that chickens fed with water treated by the inventive method and system were healthier and less aggressive to themselves and other chickens. It has further been observed that chickens fed with feed water produced according to the methods and systems of the present invention resulted in easier de-boning process and a higher yield of chicken meat.

EXAMPLE 8

Continuous Spray Test with Untreated and Treated Water

A continuous spray test with treated and untreated water was performed in April 2005. A shower curtain was hung in a 4 foot diameter cooling tower barrel. On one side of the curtain, Turbu-Flow™ treated city water was continuously distributed via 6 spray nozzles, and on the other side of the curtain, untreated city water was continuously distributed via 6 spray nozzles. Swabs were taken weekly to count microorganism levels. At the end period, the samples from the treated side did not have enough microorganisms to measure. The untreated side was saturated with microorganisms. This test showed that city water treated by the Turbu-Flow™ system cannot grow microorganisms, while untreated water will encourage the growth of microorganisms.

While certain embodiments of the present invention have been described, it will be understood that various changes could be made in the above constructions without departing from the scope of the invention. It is intended that all matter contained in the above description or shown in the accompanying drawings shall be interpreted as illustrative and not in a limiting sense.

I claim:

1. A method for improving survival rates and reducing rates of morbidity and bacterial infection of livestock, comprising;
    passing a source liquid through a low zeta potential crystal generator and thereby producing a treated liquid having an enhanced concentration of low zeta potential crystals;
    passing the treated liquid through at least one filtration system, producing a treated, filtered liquid having an enhanced concentration of low zeta potential crystals; and
    distributing the treated, filtered liquid for use and consumption in connection with livestock operations, thereby improving survival rates and reducing rates of morbidity and bacterial infection of livestock;
    wherein the filtration system is capable of substantially removing bacteria, viruses and cysts from the treated liquid.

2. The method of claim 1, wherein the zeta potential of mineral crystals in the feed liquid after passage through the low zeta potential crystal generator is at least 25% less than the zeta potential of mineral particles in the source liquid.

3. The method of claim 1, wherein the zeta potential of mineral crystals in the feed liquid after passage through the low zeta potential crystal generator is at least 50% less than the zeta potential of mineral particles in the source liquid.

4. The method of claim 1, wherein the zeta potential of mineral crystals in the feed liquid after passage through the low zeta potential crystal generator is between about −5 mV and −9 mV.

5. The method of claim 1, further comprising passing the source liquid through a pre-treatment system for substantially removing contaminants from the source liquid prior to treatment in the low zeta potential crystal generator, wherein the contaminants are selected from the group consisting of: debris, oils, and substances that would interfere with crystallization treatment.

6. The method of claim 1, further comprising passing the source liquid through a pre-treatment system for introducing additives to the source liquid prior to treatment in the low zeta potential crystal generator, wherein the additives are selected from the group consisting of: Calcium, Titanium, Vanadium, Chromium, Manganese, Iron, Cobalt, Nickel, Copper, Zinc, Molybdenum, Silver, Cadmium, Gold, Platinum, and combinations thereof.

7. The method of claim 1, further comprising passing the treated liquid through a pre-filtration system for substantially removing minerals selected from the group consisting of: iron, sulphur, manganese, and combinations thereof from the treated liquid prior to treatment in the at least one filtration device.

8. The method of claim 1, further comprising passing the treated, filtered liquid through a second low zeta potential crystal generator, thereby producing treated and filtered feed water having an enhanced concentration of low zeta potential crystals.

9. The method of claim 1, wherein the at least one filtration system is selected from the group consisting of reverse osmosis filters, microfiltration membrane filters, cellulose nitrate membrane filters, and combinations thereof.

10. The method of claim 1, wherein the livestock is chickens and wherein distributing the treated, filtered liquid for use and consumption in connection with chicken farming operations reduces the rate of morbidity of chickens.

11. The method of claim 1, wherein the livestock is chickens and wherein distributing the treated, filtered liquid for use and consumption in connection with chicken farming operations reduces the rate of cellulitis infection of chickens.

* * * * *